US010956069B2

United States Patent
Kushner et al.

(10) Patent No.: US 10,956,069 B2
(45) Date of Patent: *Mar. 23, 2021

(54) POSITIONAL INDEXING FOR A TIERED DATA STORAGE SYSTEM

(71) Applicant: EMC IP Holding Company LLC, Hopkinton, MA (US)

(72) Inventors: Peter Y. Kushner, Fiskdale, MA (US); Jonathan I. Krasner, Coventry, RI (US); Chakib Ouarraoui, Watertown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,667

(22) Filed: Jul. 24, 2019

(65) Prior Publication Data
US 2019/0347026 A1 Nov. 14, 2019

Related U.S. Application Data

(63) Continuation of application No. 15/869,198, filed on Jan. 12, 2018, now Pat. No. 10,409,516.

(51) Int. Cl.
*G06F 3/06* (2006.01)
*G06F 16/20* (2019.01)
(Continued)

(52) U.S. Cl.
CPC .......... *G06F 3/0638* (2013.01); *G06F 3/0604* (2013.01); *G06F 3/0689* (2013.01);
(Continued)

(58) Field of Classification Search
CPC .... G06F 3/0638; G06F 3/0604; G06F 3/0689; G06F 7/36; G06F 16/20; H04L 67/1097
See application file for complete search history.

(56) References Cited

U.S. PATENT DOCUMENTS 8,700,841 B2 * 4/2014 Doatmas ............. G06F 12/0246
711/103
9,330,009 B1 * 5/2016 Throop ................ G06F 11/3034
(Continued)

*Primary Examiner* — Charles Rones
*Assistant Examiner* — Hewy H Li
(74) *Attorney, Agent, or Firm* — Krishnendu Gupta; Anne-Marie Dinius

(57) ABSTRACT

The system and methods disclosed herein relate to an improvement in automated data tiering technology. The systems and methods disclosed herein enhance database storage performance characteristics in myriad ways. First, the speed with which data can be relocated from one tier to another in a tiered data storage system is increased by reducing the number of sort cycles required to perform data relocation. In addition, data relocation among the tiers is performed on the backend by an offload engine, which results in uninterrupted access to read/write commands within the data storage system from a user's perspective on the frontend. Third, users are able to adjust the percentages of hot or cold data that are relocated within the database without having to alter the service level agreements. In this way, users can make spontaneous changes to performance characteristics related to the promotion and demotion of data stored within a tiered data storage system.

16 Claims, 5 Drawing Sheets

(51) Int. Cl.
*G06F 7/08* (2006.01)
*G06F 7/24* (2006.01)
*G06F 7/22* (2006.01)
*G06F 7/32* (2006.01)
*G06F 7/14* (2006.01)
*G06F 7/06* (2006.01)
*G06F 7/16* (2006.01)
*H04L 29/08* (2006.01)
*G06F 7/36* (2006.01)
*G06F 7/10* (2006.01)
*G06F 7/12* (2006.01)
*G06F 7/20* (2006.01)

(52) U.S. Cl.
CPC ............... *G06F 7/36* (2013.01); *G06F 16/20* (2019.01); *H04L 67/1097* (2013.01); *G06F 3/0674* (2013.01); *G06F 7/06* (2013.01); *G06F 7/08* (2013.01); *G06F 7/10* (2013.01); *G06F 7/12* (2013.01); *G06F 7/14* (2013.01); *G06F 7/16* (2013.01); *G06F 7/20* (2013.01); *G06F 7/22* (2013.01); *G06F 7/24* (2013.01); *G06F 7/32* (2013.01)

(56) References Cited

U.S. PATENT DOCUMENTS

| | | | |
|---|---|---|---|
| 9,519,435 B2 * | 12/2016 | Jennas, II | G06F 3/0649 |
| 9,619,169 B1 * | 4/2017 | Throop | G06F 3/0689 |
| 2014/0173227 A1 * | 6/2014 | Min | G06F 3/0644 |
| | | | 711/159 |
| 2014/0188870 A1 * | 7/2014 | Borthakur | G06F 16/23 |
| | | | 707/736 |
| 2017/0024326 A1 * | 1/2017 | Luo | G06F 12/123 |
| 2018/0356997 A1 * | 12/2018 | Gorobets | G06F 3/0613 |

* cited by examiner

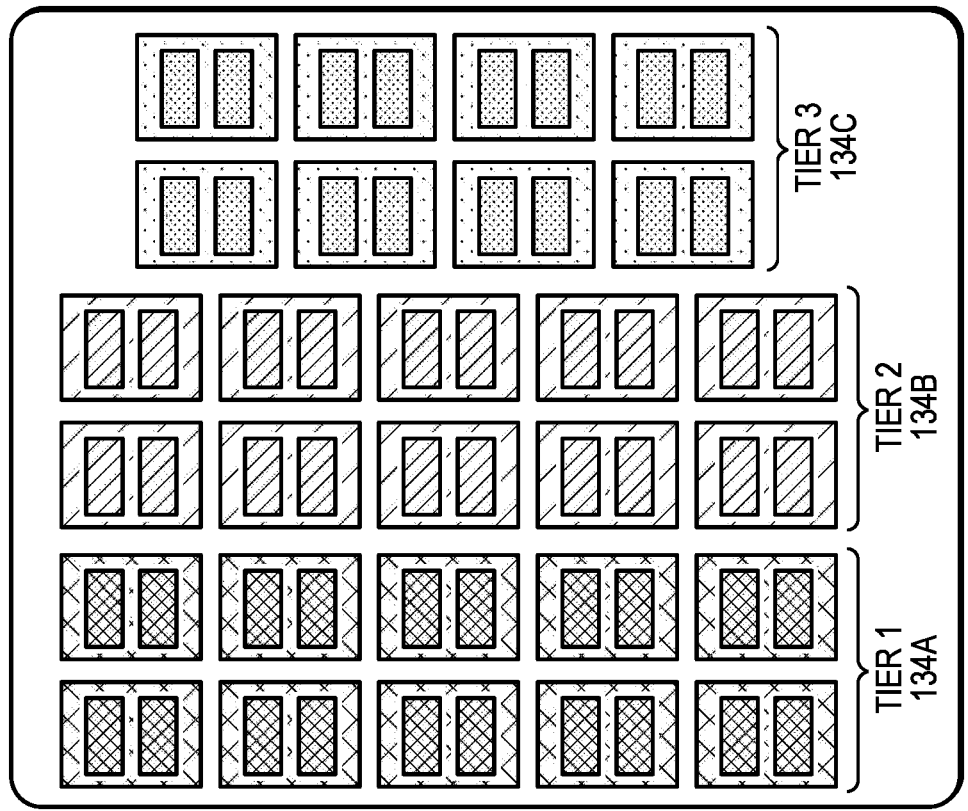
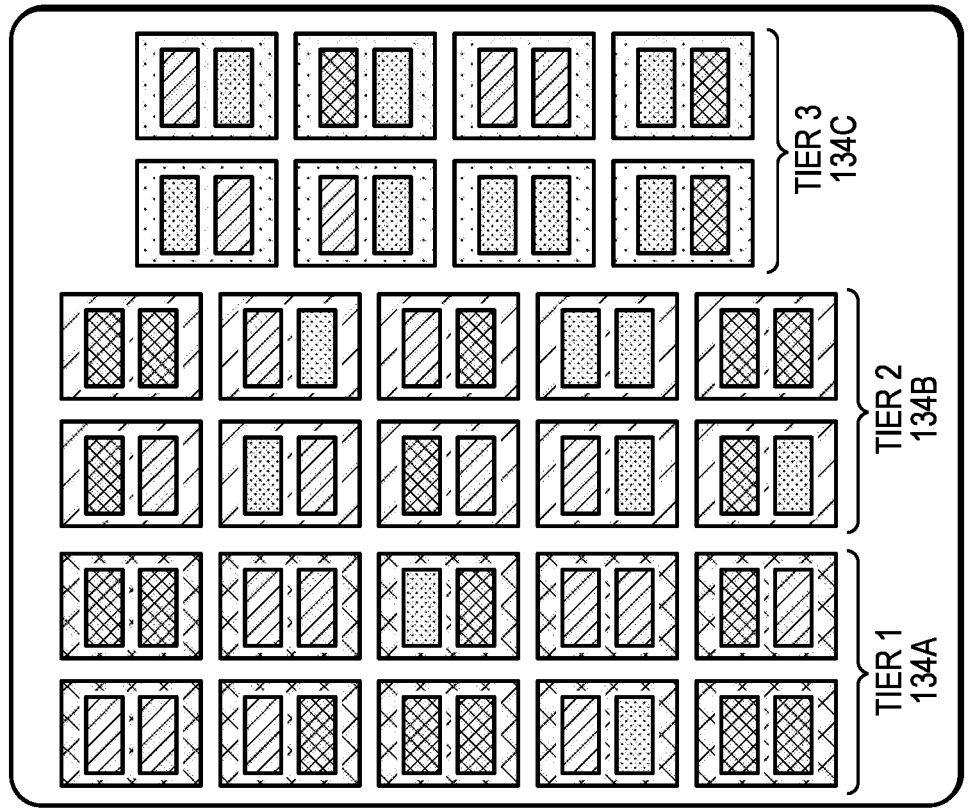
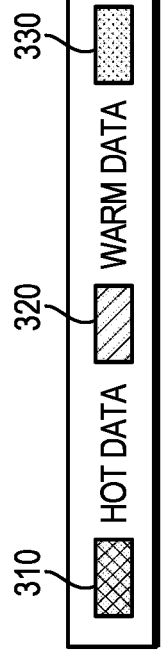
FIG. 3B
FIG. 3A

POSITIONAL INDEXING FOR A TIERED DATA STORAGE SYSTEM

FIELD OF THE INVENTION

This disclosure relates to tiered data storage systems, and, more particularly, to a system and method for improving data movement within the tiers based on data temperature calculations and user preferences for percentages of hot and cold data storage locations.

BACKGROUND

Information services and data processing industries in general have rapidly expanded as a result of the need for computer systems to manage and store large amounts of data. As an example, financial service companies such as banks, mutual fund companies and the like now, more than ever before, require access to many terabytes of data and files stored in high-capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into storage networks or Storage Area Networks ("SAN"s).

A variety of storage systems, also referred to herein as "storage arrays" or simply "arrays" are known in the art. One example of a storage system is a collection of storage devices (e.g., solid-state disk drives or flash memory drives) and associated communication, power, cooling, and management components. Such storage systems can also include one or more storage processors for handling both requests for allocation and input/output (IO) requests from a user. A storage processor can be the controller for and primary interface to the storage system.

Storage systems are typically used to provide storage space for one or more computer file systems, databases, applications, and the like. For this and other reasons, it is common for storage systems to be logically partitioned into chunks of storage space. This allows a unified storage system to appear as a collection of separate file systems, network drives, etc. Storage systems can be logically partitioned in a variety of ways. For example, the storage devices (e.g., disk drives) of a storage system can be logically organized into one or more redundant array of inexpensive disks ("RAID") groups. A RAID group is a group of physical storage devices across which data can be distributed and/or replicated to achieve redundancy. This can avoid the loss or unavailability of data arising from a hardware failure such as a disk drive failure.

Alternatively, or in addition, the physical storage area of a storage system can be divided into discrete units called slices. A collection of slices along with a map can create a logical unit. A logical unit can then be described as a set of logical slices, with each logical slice mapping to one or more physical slices in the storage system.

In a storage area network, a collection of storage systems can be networked together via a switching fabric to a number of host computer systems operating as servers. The host computers can access data stored in the storage systems (of a respective storage area network) on behalf of client computers that request data from the data storage systems. For example, according to conventional applications, upon receiving a storage access request, a respective host computer in the storage area network can access a large repository of storage through the switching fabric of the storage area network on behalf of the requesting client. Thus, via the host computer (e.g., server), the client has access to the shared storage system. In many applications, storage area networks support high-speed acquisitions of data so that the host servers are able to promptly retrieve data from and store data to the storage system.

A storage area network can also be logically divided into one or more "storage pools." A storage pool can be a collection of one or more storage systems, a collection of subsets of one or more storage systems, or a subset of a single storage system. Thus, a storage pool can contain one or more logical units, and each logical unit can include one or more slices.

Performance of a storage system can be characterized by the system's total capacity, response time, throughput, and/or various other metrics. The capacity of a storage system is the maximum total amount of data that can be stored on the system. The response time of a storage system is the amount of time required to read data from or write data to the storage system. The throughput of a storage system is a measure of the amount of data that can be transferred into or out of (i.e., written to or read from) the storage system over a given period of time. Performance of a storage system can be measured and/or quantified at various levels, such as at the storage pool level, at the logical unit level, at the logical slice level, at the storage system level, at the RAID group level, at the disk level, etc.

The administrator of a storage array can desire to operate the storage system in a manner that maximizes throughput and minimizes response time. In general, performance of a storage system can be constrained by both physical and temporal constraints. Examples of physical constraints include bus occupancy and availability and uneven distribution of load across disks or across RAID groups. Examples of temporal constraints include bus bandwidth, bus speed, serial versus parallel access to multiple read/write heads, and the size of data transfer buffers.

Data has a lifecycle. As data progresses through its lifecycle, it experiences varying levels of activity. When data is created, it is typically used heavily. As it ages, it is typically used less frequently. In recognition of this, developers have worked to create systems and methods for ensuring that heavily used data are readily accessible, while less frequently used data are stored in a more remote location. Correlations between location of data storage and frequency of access to data are necessary because storage has an inherent cost. Generally speaking, the faster the storage medium is at providing access to data, the costlier the storage medium.

Two concepts relevant to the tradeoffs between data usage and storage costs are relevant for purposes of the embodiments disclosed herein. First, data storage systems involving tiered storage have emerged. Tiered data storage systems include multiple tiers of non-volatile storage with each tier providing a different quality of service. For example, a system may include a first tier (Tier 1), a second tier (Tier 2) and a third tier (Tier 3). By way of example, solid-state drives, cache, and cloud storage can be used within tiers with one unique type of technology being used within each tier. The fastest technology will be in tier 1, the next fastest in tier 2 and the slowest in tier 3. As advances in data storage mediums and speeds are recognized over time, the types of storage used and the tiers in which they are used will vary.

The type of drive interface can have a significant impact on overall disk array performance. For example, a multi-head drive that supports reads or writes on all heads in parallel will have a much greater throughput than a multi-head drive that allows only one head at a time to read or write data.

Tiered data systems manage placement of data on the different storage tiers to make the best use of disk drive speed and capacity. For example, frequently accessed data may be placed on Tier 1 storage. Less frequently accessed data may be placed on Tier 2 storage. And seldom accessed data may be placed on Tier 3 storage.

The second concept of importance is the notion of categorizing data so that it can be stored on the most appropriate tier. Temperature variance has been used as a framework for distinguishing between data that is frequently used, i.e., "hot" as compared to less frequently used data, or "cold" data.

A significant challenge in the categorization of data within tiered data storage systems is the effect time has on data categorization. Typically, data are hot for a limited amount of time. In addition, determining the data temperature also consumes computing resources requiring prudence in judging how frequently to assess the temperature of the vast amounts of data that can be stored in a database. Furthermore, moving data among the tiers also consumes substantial computing resources, which again necessitates tradeoffs in terms of overall resource allocation.

Some data storage systems perform automatic storage tiering. These systems monitor the activity of storage elements and move data between storage tiers to best utilize available resources and promote efficiency. For example, a Tier 2 data set may be moved to Tier 1 if the automated system determines the data have become hotter. Similarly, data may be demoted from Tier 1 to Tier 2 if the system determines the data have become colder.

Automated storage tiering algorithms are typically run on a central processing unit, which is itself part of the data storage system. The system resources required to compute data temperatures for purposes of assessing whether data should be reallocated to a different tier are significant, especially for large enterprise databases. In addition, once the system determines which data should be moved from one tier to another, executing the various read/write/copy functions necessary to move the data from one tier to another is additionally resource intensive. Further compounding the data movement issue is the fact that the temperature of the data is in constant flux.

One problem with existing storage management methods and systems is that logical units and the slices thereof are allocated in a storage pool as "best-fit" at the initial allocation time. At this time, however, the IO load pattern of each logical unit and/or each slice of data is not known. In other words, a user's performance requirements with respect to a given logical unit or with respect to a given slice of data within that logical unit is generally either not known or only roughly approximated when that logical unit is created. Thus, the performance capability of a logical unit or slice can be too high or too low for the data to which it corresponds. For example, allocating a logical unit containing frequently accessed data to a lower performance tier in a storage pool will result in the storage pool appearing "slow" to a user. Likewise, allocating a logical unit containing rarely accessed data to a higher performance storage tier results in a waste of the storage system's performance capability.

Another problem with existing methods and systems is that they fail to compensate for the fact that users' performance requirements will often change over time, in part because data access patterns tend to change over time. Older data is generally accessed less frequently and therefore does not require storage with higher performance capabilities. In existing storage methods and systems, as once-frequently-accessed data ages, it can remain on a high-performance storage tier, taking up valuable space that could be used to store newer, more-frequently-accessed data. Thus, as data "ages" and becomes less-frequently accessed, it can be desirable to relocate it to a lower performance storage tier. In order to address these shortcomings, many data storage systems have adopted automated data tiering wherein frequently-accessed data are promoted to a higher-performance storage tier, while less-frequently-accessed data are demoted to a lower-performance storage tier.

Data relocation within an automated tiering system is a two-step process. First, data slices have to be evaluated to determine their relative temperature. The most active data slices, as defined by their read/write/pre-fetch statistics, are considered the "hottest," while the least active data slices are the "coldest." One data have been analyzed and assigned a value indicative of temperature, the next step is identifying promotion/demotion candidates based on the current tier location of each slice and its current temperature. In this way, data slices are flagged for promotion or demotion.

At any given time, there could be a large number of data slices requiring relocation. Ideally, the data storage system would ensure that data slices on the extreme ends of the temperature spectrum, i.e., the hottest data and the coldest data, would be relocated first. To achieve this, data slices are typically sorted in two distinct processing sorts. In one sort operation, hot data are organized in descending order, hottest to less hot. In a second sort operation, cold data are organized in ascending order, coldest to less cold. Requiring two sort functions of the data consumes compute resources that could otherwise be devoted to improved system performance.

Moreover, typical automated tiering systems do not allow a user to adjust the percentages of hot and cold data he or she would like to be selected as candidates for relocation. These percentages are typically established in a service level agreement. There is therefore a need to allow users to make spontaneous adjustments to the percentages of hot and cold data that are flagged for relocation as a means of being able to optimize system performance in real time.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The systems and methods disclosed herein enhance database storage performance characteristics in myriad ways. First, the speed with which data can be relocated from one tier to another in a tiered data storage system is increased by reducing the number of sort cycles required to perform data relocation. In addition, data relocation among the tiers is performed on the backend by an offload engine, which results in uninterrupted access to read/write commands within the data storage system from a user's perspective on the frontend. Third, users are able to adjust the percentages of hot or cold data that are relocated within the database without having to alter the service level agreements. In this way, users can make spontaneous changes to performance characteristics related to the promotion and demotion of data stored within a tiered data storage system.

BRIEF DESCRIPTION OF THE DRAWINGS

FIGS. 3A and 3B are functional lock diagrams of data sorting within a tiered data storage system according to embodiments.

DETAILED DESCRIPTION

Figure 1:
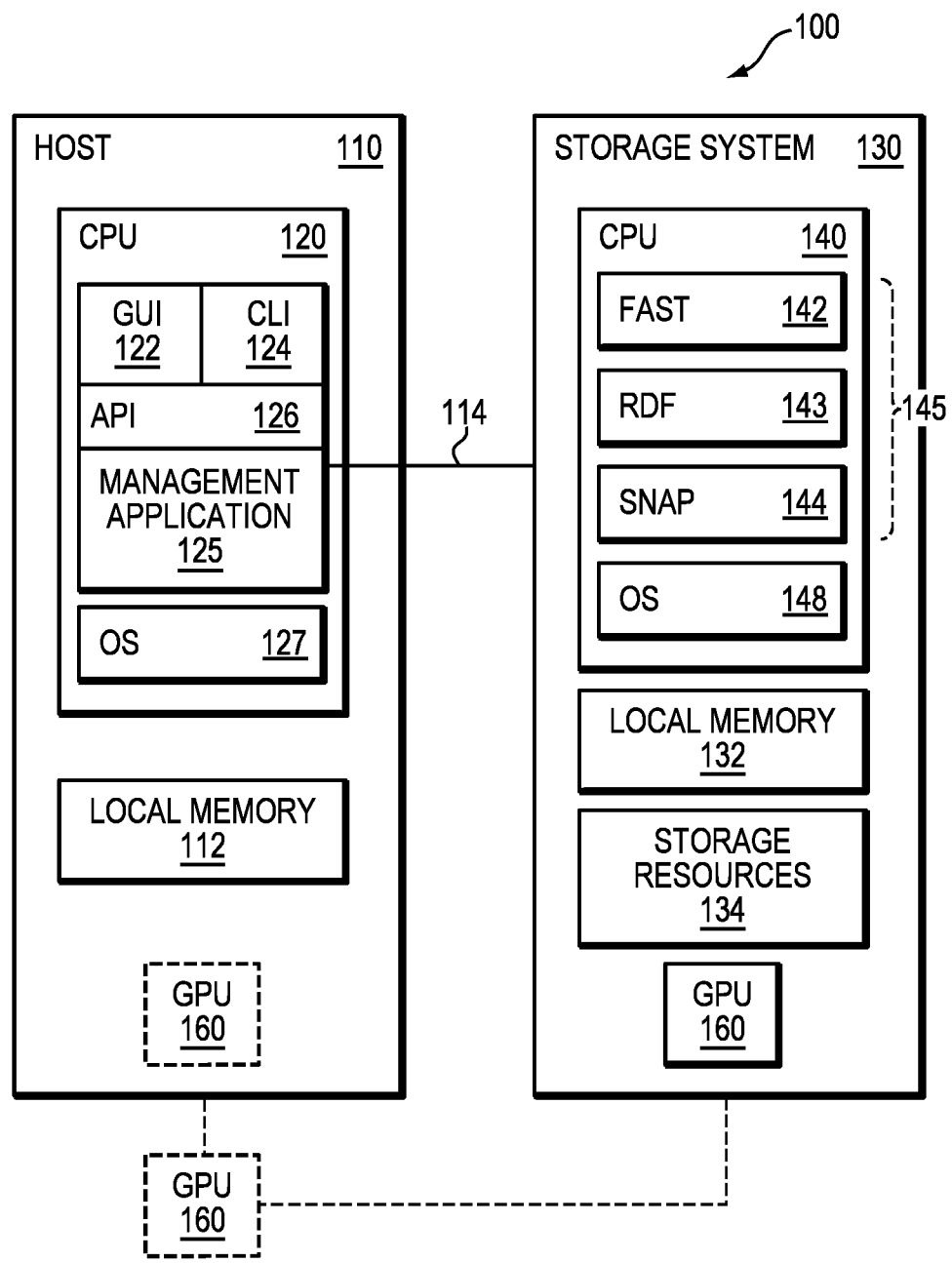
FIG. 1 is a functional block diagram of an exemplary system for improving the speed and efficiency associated with data movement within storage tiers based on data temperature calculations and user preferences for percentages of hot and cold data storage locations.

FIG. 1 shows an example storage environment 100 including a host 110 and a storage system 130. Host 110 and storage system 130 are connected by communication channel 114 to enable host 110 to control operation of the storage system 130.

Host 110, in some embodiments, is a computer having one or more Central Processing Units 120 and local memory 112. An operating system 127 executes on CPU 120, which enables CPU 120 to execute one or more instances of storage system management application 125. The storage system management application 125 has a set of storage system Application Program Interfaces (APIs) 126 that enables the storage system management application 125 to control execution of applications 145 running within a processing environment of the storage system 130.

The storage system management application 125 has a Command Line Interface 124 that enables users to manually input data to the storage system management application 125. By setting information into the storage system management application 125, the user can control how the storage system management application 125 adjusts operation of the applications 145 running on the storage system 130. Through the use of the CLI 124, a user can set various parameters, such as the relative priority of the various applications 145, the Quality of Service (QoS) each application should receive, IO limits for the applications 145, and other similar types of parameters. The CLI 124 thus allows the management application user to control execution of the applications 145 running on the storage system 130 to ensure that the applications 145 running on storage system 130 are executing to provide access to data in a manner consistent with the user's objectives. In some embodiments, the CLI 124 and API 126 are consolidated into a single software layer. One example CLI 124 is available from Dell EMC™ and referred to as Solutions Enabler.™ Other command line interfaces may likewise be created and used to interact with and control execution of the storage system management application 125.

In some embodiments, a Graphical User Interface (GUI) 122 is built on top of the API 126. GUI 122 consolidates operations to facilitate control of applications 145 using a more user-friendly interface than the CLI 124. One example GUI 122 is available from Dell EMC™ and referred to as Unisphere.™ Other graphical user interfaces 122 may likewise be created and used to interact with and control execution of the storage system management application 125. In some embodiments, GUI 122 facilitates interaction between the user and storage system management application 125, for example to enable the user to make provisioning decisions, generate reports, and ensure the health of all systems in the storage environment 100. In some implementations, GUI 122 allows the user to remotely create storage resources on the storage system 130, configure and schedule data protection protocols managed by storage system 130, and manage and monitor storage operations of storage system 130.

Although GUI 122 is shown in FIG. 1 as implemented on host 110, it should be understood that in some embodiments GUI 122 may be implemented using a client/server model. Accordingly, depending on the implementation, the components described in conjunction with FIG. 1 may be implemented on one or more separate networked processing environments.

In some embodiments, the storage system management software 125 is configured to enable the user to perform service level provisioning to specify the quality of service provided by the applications 145 running on storage system 130. Quality of service may be set on a per application per channel basis, per application for a group of channels, for a Storage Resource Pool (SRP), for a set of SRPs, or for some other measurable basis. As used herein, the term Quality of Service (QoS) will be used to refer to performance parameters of the Storage System 130. Example performance parameters that may be specified as QoS may include response time and other measurable performance related parameters. When a user specifies service level parameters for an application 145, the storage system management application 125 adjusts the priority, IO limits, and other performance aspects of the impacted application 145, and optionally other applications 145 also running on the storage system 130, to enable the storage system 130 to meet the provisioned service level.

As shown in FIG. 1, the storage system 130, like host 110, has a CPU 140 and local memory 132. Storage system 130 may have multiple CPUs 140. An operating system 148 executes on CPU 140 to control storage resources 134 and enable execution of applications 145. Applications 145 manipulate data stored in storage resources 134. Operating systems 127, 148 could be Linux systems in some embodiments.

Figure 2:
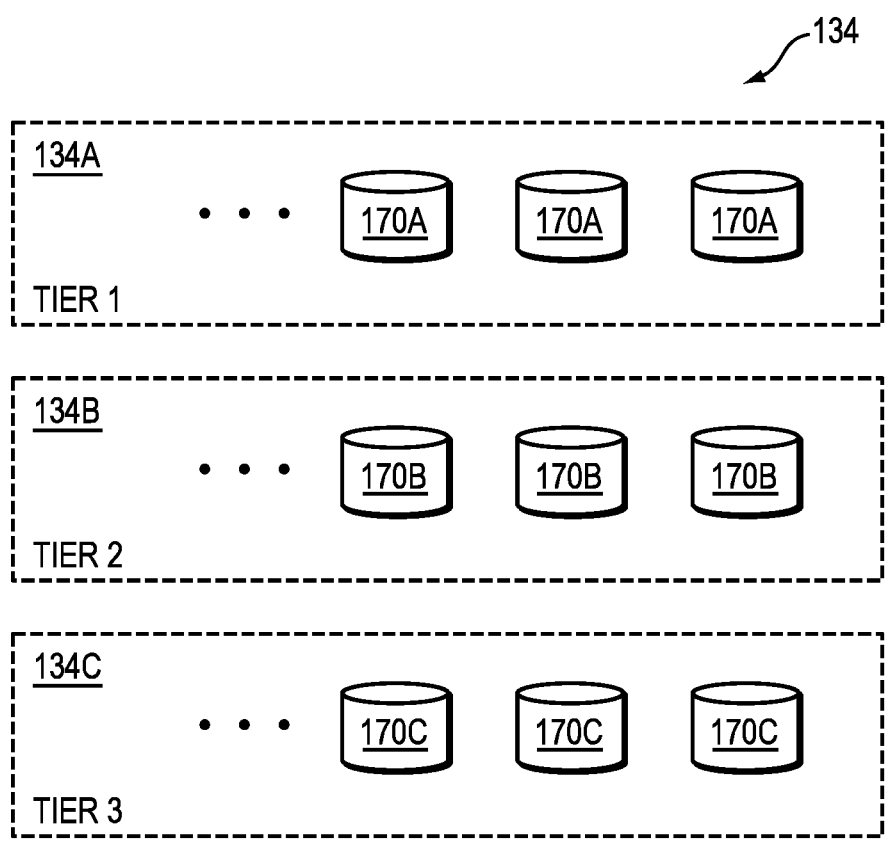
FIG. 2 is a functional block diagram of an exemplary tiered storage environment configured to provide efficient data relocation among the tiers according to embodiments.

Storage resources 134 may be implemented using a number of different storage technologies. In some implementations storage resources 134 are configured as tiered storage, as depicted in FIG. 2. A tiered storage system 134 is a storage system that supports storage tiers 134A, 134B, 134C for which the operational costs per unit of input/output operation processing, on a per unit of storage capacity, are different. Differences may be due to the use of different underlying drive technologies, such as Enterprise Flash Drives (EFD) or other solid-state drives. Alternatively, the differences between storage tiers 134A, 134B, 134C may be due to different strategies for leveraging storage capacity, such as through compression, or the use of different power management strategies. Many ways of differentiating storage capabilities may be used to identify and define tiers 134A, 134B, 134C of storage in a tiered storage system.

Applications 145 execute within storage system 130 to access and operate on storage resources 134. By way of example and without limitation, one application 145 is a Fully Automated Storage Tiering (FAST) application 142, configured to move data between tiers of storage resources 134 within storage system 130. Different groups of storage resources (storage resource pools) may be separately managed by individual FAST applications. Hence a given storage system 130 may have multiple instances of FAST application 142 executing therein at the same time.

Another example application is a Remote Data Forwarding (RDF) application 143, which causes subsets of data stored within storage resources 134 to be mirrored to one or more similar remote storage systems (not shown). The RDF application 143 also allows data stored by other remote storage systems (not shown) to be mirrored to the storage system 130 and stored within the storage resources 134. A given storage system 130 may operate as a primary node or secondary node in many mirroring pairs, and hence multiple RDF applications 143 may simultaneously execute on storage system 130 to control participation of storage system 130 in the mirroring operations.

Another example application that may be executed by CPU 140 may be a snapshot application (SNAP) 144 configured to provide point-in-time data copying. A snapshot is a copy of data as that data existed at a particular point in time. Multiple SNAP applications 144 may be executing on a given storage system 130. Other applications 145 may likewise be executing on storage system 130. The particular set of applications 145 will depend on the particular implementation.

FIG. 2 shows an embodiment of storage resources 134 implemented in three tiers, namely Tier 1 134A, Tier 2 134B, and Tier 3, 134C. Each of the storage tiers 134 has multiple physical discs 170A, 170B, 170C, which collectively provide storage for the respective tier. Although FIG. 2 depicts three (3) physical disks 170 per tier 134, alternative design implementations could be realized. For example and without limitation, the number of disks 170 per tier 134 could be varied. In addition, cloud storage at any given tier 134 could be realized.

As noted above, FAST application 142 operates to move data within storage resources 134, such as between storage tiers 134A, 134B, and 134C to optimize access to data stored within storage resources 134. When FAST application 142 is run, it utilizes CPU 140 to determine and flag data segments as candidates for relocation. In addition, CPU 140 performs the necessary processes to effectuate promotion/demotion among the tiers 134A, 134B, and 134C.

Service level provisioning in storage system 130 ensures that storage 130 is provisioned with a set expectation for performance, for example system response time. FAST 142 and other aspects of the Operating System 148 coordinate to achieve QoS targets as established within the service level agreement(s). An additional means of achieving QoS, as discussed previously, is to run automated tiering software on the backend. This, however, has the drawback of consuming CPU 140 resources, which in turn reduces the amount of IO operations the storage system 130 is able to process.

In some embodiments, storage administrators may want to limit the amount of IO (IOPS) or bandwidth (MB/s) a particular application 145 can drive on the storage system. Accordingly, storage system management application 130 enables the user to specify performance targets for the applications 145 as well as to define limits to enforce service level agreements and make application performance more predictable. Host IO limits features allows the user to limit front-end port performance by either IOPS, Host MB per host, or both. The limits may be set for particular storage resource pools, on a per channel basis, or on another basis. Once set by the administrator, the bandwidth and IOs controls are then monitored by the storage system 145 to attempt to meet the defined service level agreements while also ensuring that the applications 145 do not exceed the specified maximum bandwidth or maximum IOPS.

The storage system management application 125 enables the user to set priorities for the applications 145 to realize the overall service level agreements for the applications 145 under control. The storage system management application 125 allows the user to monitor operation of the storage system 130 to determine whether it is achieving the QoS requirements specified in the service level agreement. If the QoS targets are not being met, the user can use the GUI 122 or the CLI 124 to adjust priorities of the applications 145 to better enable the storage system 130 to operate in accordance with its service level agreement. For example, the user may prioritize FAST 142 over other applications 145. Different priorities may be set for different channels, such that each iteration of the applications is adjusted to allow the QoS to be met within the channel.

FIG. 1 also includes an off-load engine within the storage environment 100, which in embodiments can be a graphics processing unit ("GPU") 160. Throughout this specification, the terms "off-load engine," "graphics processing unit," and "GPU" are used interchangeably without limitation. In some embodiments, GPU 160 is internal to the storage system 130. In an alternate embodiment, GPU 160 is located internal to host 110. In yet an additional embodiment, GPU 160 could be external to storage system 130 or host 110, instead being communicatively coupled to either storage system 130 or host 110.

As previously stated, storage tiering is the movement of data to different types of storage areas, e.g., disks or cloud-based systems, in accordance with network performance and capacity requirements. In a typical storage environment 100, 95% of application data has little IO activity. Tiering takes this fact into account by allowing the majority of data to reside in slower, cheaper storage areas, while simultaneously ensuring that the most active data are stored on the fastest drives, e.g., Fibre Channel, or flash solid state drives ("SSD").

In an exemplary storage system 130, Tier 1 134A could be an extreme performance tier. The extreme performance drives 170A could be comprised of flash technology SSDs, which contain no moving parts. Flash drives have a higher per-GB storage cost, but a lower input/output ("IO") cost compared with spinning drives. In this embodiment, Tier 1 134 would contain "hot" data, i.e., data that typically requires fast response time and/or high IO per second.

In this exemplary storage system 130, Tier 2 134B could be designated as the performance tier. The performance tier 134B could be used to store "warm" data. In Tier 2 134B, it is possible to achieve a combination of performance and capacity. In an embodiment, Tier 2 134B could be a cloud-based storage system. The performance tier 134B offers high, all-around performance with consistent response times, high throughput, and good bandwidth at a mid-level price point.

In this exemplary storage system 130, Tier 3 134C could be used to store "cold" data. Tier 3 134C could be referred to as a capacity tier. The capacity tier 134C is often used to decrease the cost per GB of data storage. In one embodiment, the capacity tier drives 170C could be RPM Near-Line SAS ("NL-SAS") drives. Although NL-SAS drives have a slower rotational speed than the SAS drives used in the exemplary performance tier 134B, the NL-SAS drives significantly reduce energy use and free up capacity in the more expensive, higher performance tiers 134A and 134B. In an alternate embodiment, Tier 3 134C could be a cloud-based storage system.

Data relocations can be done on a per-storage-extent basis, i.e., at the granularity of an individual storage extent. As is known, a "storage extent" is an increment of contiguous storage, such as a block or a slice. A "block" is the smallest unit of storage that may be allocated to a data object and may be, for example, 8 KB in size, although block sizes can vary considerably. A "slice" is the smallest unit of storage that may be provisioned to a data object. Typical slice sizes are 256 MB or 1 GB. As used herein, the term storage extent or extent is intended to cover not only units, like blocks or slices, but also larger structures built from such units, such as LUNs, storage pools, arrays, vectors, and even an entire data set within a database. It should be understood that the definition of storage extent is intended to be flexible. For example, a storage extent may be a physical extent or a logical extent. Also, the particular examples of storage extents provided herein are intended to be merely illustrative.

In terms of user control over automated tiering, users can define a tiering policy. The tiering policy specifies the tier 134 within which new data will be placed as well as how data will be relocated to an alternate tier 134 during scheduled and manually invoked relocation periods. By way of example, a tiering policy could utilize the highest available tier. In a highest available tiering policy, data could be placed in the highest performing tier until that tier was full, at which point, data would be placed in the next highest performance tier having capacity.

An alternative tiering policies is a lowest available tier policy. In a lowest tiering policy, data are placed in the lowest performing tier 134 until that tier is full, at which point, data is placed in the next lowest available tier. A user could define a "no data movement" tiering policy as well. In this type of tiering policy, data are moved within a tier 134, but not from one tier 134 to another.

Of particular relevance for the present invention is an automatic tiering policy. Auto-tiering policies automatically relocate data to the most appropriate level based on the activity level of each storage extent. Data are relocated based upon the highest available tier 134 and the storage extent's temperature. FIG. 3A illustrates a typical tiered storage system 130 before data have been relocated using an auto-tiering policy. The storage system 130 has storage resources 134 comprised of a three tiers 134. Data extents are distinguished in FIG. 3 based on its activity level, i.e., the frequency with which the extent is accessed for purposes of a read, write, or pre-fetch function within the data storage system 130. In an auto-tiering data storage system, the most active, or hot, data are ideally located in Tier 1 134A. The moderately used, or warm, data are ideally located in Tier 2 134B. And the least used, or cold, data are ideally stored in Tier 3 134C.

As can be seen in FIG. 3A, hot data 310, warm data 320, and cold data 330 are interspersed among the tiers 134. In an ideal environment, hot data 310 would reside in Tier 1 134A; warm data 320 would be in Tier 2 134B; and cold data 330 would be in Tier 3 134C. As a result of the mismatch between data temperature and tier location, the data storage environment 100 will experience sub-optimal performance. Specifically, in this mismatched state, the data storage environment 100 will experience at least the following sub-optimal conditions: increased latency, increased cost of data storage, and increased energy consumption. FIG. 3B shows the same tiered storage system 134 after data have been relocated.

Figure 4:
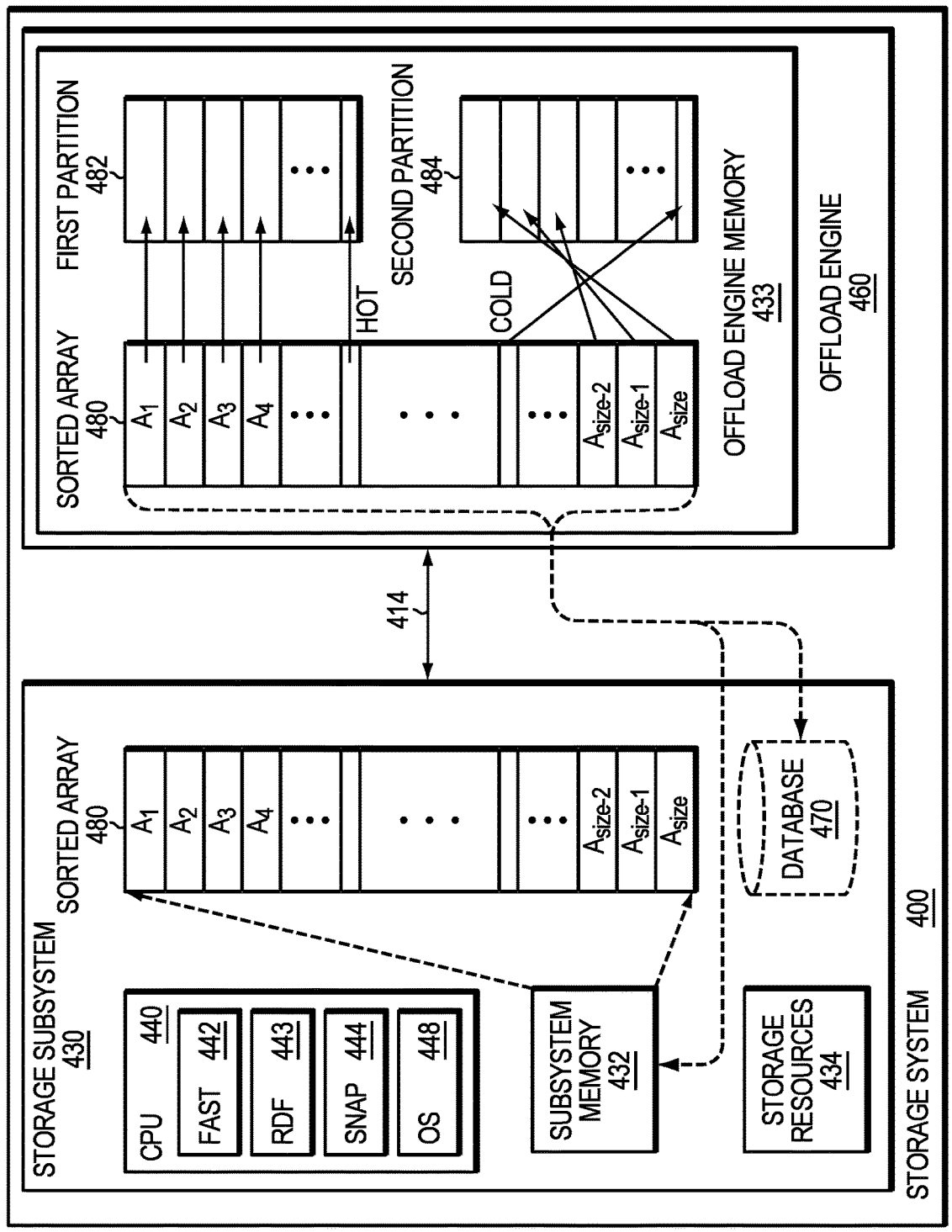
FIG. 4 is a functional block diagram of an exemplary system for improving the speed and efficiency associated with data movement within storage tiers based on data temperature calculations and user preferences for percentages of hot and cold data storage locations.

FIG. 4 shows an example data storage system 400 including a storage subsystem 430 and an offload engine 460. The storage subsystem 430 and the offload engine 460 are connected via communication channel 414 to enable communication therebetween. The structure shown in FIG. 4 is comparable to that shown in FIG. 1. Different reference numbers have been used simply for clarity, not to imply distinctions between components having like names throughout this specification.

The storage subsystem 430 is further comprised of a central processing unit 440, Applications 445, which could be FAST, 442, RDF 443 and SNAP 444. Similarly, the CPU also includes an operating system 448. The central processing unit 440 could also be a general processing unit, a purpose-built processor, an ASIC, and the like in alternate embodiments.

The storage subsystem 430 also includes locations for data storage, i.e., storage resources 434, a storage subsystem memory 432, and optionally a database 470. As will be discussed below, storage resources 434 are a tiered data storage system. One of the purposes of storage subsystem memory 432 is for capturing data hierarchies within storage resources 434 to facilitate re-tiering of data as a back-end function. In this way, users experience uninterrupted access to data stored within storage resources 434 while data storage system 400 is performing re-tiering evaluation and relocation. Toward that end, database 470 can be used for redundancy or to increase speed of backend re-tiering calculations and relocation by adding memory capacity to storage subsystem 430.

Similarly, offload engine 460 could be a central processing unit, a general processing unit, a purpose-built processor, an ASIC, or the like. Offload engine 460 further comprises offload memory 433. Although offload engine is pictured as being internal to storage system 400, in alternate embodiments, offload engine 460 could be external to storage system 400. In these embodiments, offload engine 460 and storage system 400 would be communicatively coupled.

Although FIG. 2 depicts three storage tiers 134 in alternate embodiments, the number of tiers could vary. Specifically, there could be an embodiment having a single tier within the storage resources 434 wherein that single tier could be partitioned into slices having differing performance characteristics. Similarly, the storage resources 434 could contain two tiers having some or all of the tiers containing differing performance characteristics. Alternatively, there could be embodiments having four or more tiers in the storage resources 434.

Irrespective of the number of tiers contained within the storage resources 434, the performance characteristics typically associated with the differing tiers or slices within tiers could be defined in a service level agreement. In some embodiments, and as stated previously, users can alter performance characteristics through GUI 122 or CLI 124. In addition, in embodiments herein users can gain some level of control over how much hot data or cold data are relocated within the storage system 400 during data relocation or re-tiering cycles.

Figure 5:
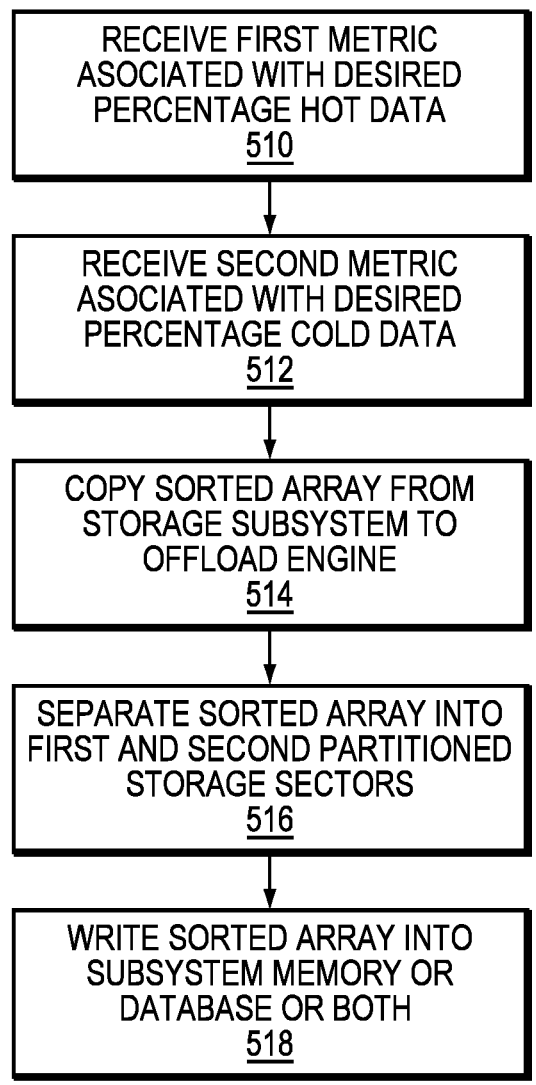
FIG. 5 is a flow diagram showing exemplary steps of method embodiments for improving the speed and efficiency associated with data movement within storage tiers based on data temperature calculations and user preferences for percentages of hot and cold data storage locations.

FIG. 5 depicts method steps for providing this type of control to users. According to these embodiments, a user can input a first metric associated with a desired percentage of hot data to be relocated during a re-tiering cycle. In addition, the user could also input a second metric associated with a percentage of cold data to be relocated during a re-tiering cycle. If the user does not specify a percentage for either the hot data or the cold data, in embodiments, there could be a default percentage provided for the first and second metrics.

From the storage system's 430 perspective, the first metric could be received 510 at the host 110 and transmitted to the storage system 430 or the offload engine 460 via communication pathways 114 and 414. Similarly, the second metric could be received 512 at the host 110 and transmitted to the storage system 430 or the offload engine 460 via communication channels 114 or 414. In typical prior art re-tiering operations, it is necessary for the storage system 430 to perform two operations to construct the arrays that will ultimately contain the hot data to be relocated and cold data, which will also be relocated. Typically, hot data, which are to be relocated, are stored in an array in descending order, with the hottest data entry being located in the first row of the array. In contrast, when the storage system 430 constructs the array containing cold data that will be relocated, the array is typically constructed having the coldest data at the top, or in ascending order, so the extents to be demoted appear at the top of the list.

In order to improve system performance, embodiments herein reduce the computation cycles required to construct the hot and cold relocation arrays to a single sort operation. Referring again to FIG. 5, the steps required to perform the single sort are: copying 514 a sorted array 480 from the storage subsystem 430 to the offload engine 460; separating 516 the sorted array 480 into a first partitioned sector 482 and a second partitioned sector 484; and writing 518 the sorted array to storage subsystem memory 432, database 470, or both.

The sorted array 480 could contain all data entries designated for relocation in descending order, that is, hottest to coldest. Specifically, $A_1$ could be the hottest data, while $A_{size}$ is the coldest data. In these embodiments, the sorted array 480 is copied to the offload engine 460 because users may still need access to data that has been flagged for relocation during the time period within which these data are being relocated.

In embodiments, the first partitioned sector 482 could be for hot data designated for relocation. In this embodiment, the hot data could be sorted in descending order, with $A_1$ in the first row of the first partitioned sector 482; and the cold data in the second portioned sector 484 could be in ascending order with $A_{size}$ being located in the first row.

The sorted array 480 A is a very large array that has a set size of $A_{size}$. Within this array 480 the top $A_n$ elements, where $A_n$ is less than or equal to $A_{size}$, contain the real sorted data and equate to the number of rows in the database 470. Given the current number of elements of $A_n$ for the sorted array 480 A, a 'hot' percentage, represented by a first metric, of % h and a 'cold' percentage, represented by a second metric, of % c, 'hot' (H) array 482 and 'cold' (C) array 484 are created of size $H_{size}=(A_n*\% \text{ h})/100$ and $C_{size}=(A_n*\% \text{ c})/100$ respectively. The index, $C_{start}$, of the start of the 'cold' data in the sorted array 480 A is calculated as $A_n-C_{size}$. To reduce latency, the following algorithm is performed once the data has been sorted in ascending order by 'score' on the offload engine 460, which could be a GPU:

Copy the sorted array 480 $A_G$ from GPU device, also called offload engine, memory 433 to the similarly sized array A in storage subsystem memory 432 in the storage subsystem 430. For each array element at index i in the sorted array 480 in offload memory 433:

If index i is less than $H_{size}$

Copy the $i^{th}$ element of sorted array 480 A to the $i^{th}$ element of the 'hot' data array 482 H Update storage subsystem memory 432 or database 470 or both with the information from the $i^{th}$ element of sorted array 480 A If index i is greater or equal to $C_{start}$ Calculate the index $C_{index}$ into the cold array 484 C:

$$C_{index}=(C_{size}-1)-(i-C_{start})$$

Copy the $i^{th}$ element of sorted array 480A to the $C_{index}^{th}$ element of the 'cold' data array 484 C Update storage subsystem memory 432 or database 470 or both with the information from the $i^{th}$ element of sorted array 480 A If index i is greater than or equal to $H_{size}$ or less than $C_{start}$ update storage subsystem memory 432 or database 470 or both with the information from the $i^{th}$ element of sorted array 480 A Upon completion of the above algorithm, along with storage subsystem memory 432 or database 470 or both being updated, there are now three sorted arrays:

Array A 480 (with size $A_{size}$) sorted in descending order

Array H 482 (with size $H_{size}$) sorted in descending order

Array C 484 (with size $C_{size}$) sorted in ascending order

However, only one sort was actually performed. The other two sorts were performed only by $C_{size}$ calculations and $H_{size}+C_{size}$ comparisons and memory transfers.

Accordingly, embodiments herein improve data storage system performance by increasing speed and reducing computational overhead. In addition, embodiments herein allow users to customize the amount of resources devoted to data movement among the tiers 134. For illustrative purposes, it may be the case that a user wants to ensure that tier locations 134 for hot data are frequently updated. In that situation, the user would increase the value for the first metric. Similarly, if the user wanted to ensure that more cold data were demoted during a relocation cycle, the user could increase the value of the second metric. Those of skill in the art will recognize that the choice of a first metric being associated with hot data and the second metric being associated with cold data is arbitrary and could be swapped.

The methods described herein may be implemented as software configured to execute in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

The methods described herein improve the operation of storage system 130, in that the methods change how the storage system 130 adjusts execution of applications 145 to cause execution of the applications 145 to meet specified service level objectives. In particular, using weighting and an off-load engine, the method described herein enable the storage system 130 to reliably meet specified quality of service settings.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The following reference numbers are used in the drawings:

- 100 storage environment
- 110 host
- 112 host local memory
- 114 communication channel
- 120 host CPU
- 122 host graphical user interface
- 124 host command line interface
- 125 storage system management application
- 126 application program interface
- 127 host operating system
- 130 storage system
- 132 storage system local memory
- 134 storage system resources or tiered storage
- 140 storage system central processing unit
- 142 storage system application—Fully Automated Storage Tiering ("FAST")
- 143 storage system application—Remote Data Forwarding ("RDF")
- 144 storage system application—Snapshot Application ("SNAP")
- 145 storage system applications
- 148 storage system operating system
- 160 graphics processing unit
- 170 memory storage drive
- 310 hot data
- 320 warm data
- 330 cold data
- 400 storage system
- 414 communication channel
- 430 storage subsystem
- 432 storage subsystem memory
- 433 offload engine memory
- 434 storage resources
- 440 central processing unit
- 442 FAST
- 443 RDF
- 444 SNAP
- 445 applications
- 448 operating system
- 460 offload engine
- 470 database in storage subsystem
- 480 sorted array
- 482 first partitioned array
- 484 second partitioned array
- 510 receive first metric
- 512 receive second metric
- 514 copy sorted array
- 516 separate sorted array into partitioned storage sectors
- 518 write sorted array into subsystem memory or database or both Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for sorting data in a data storage system comprising a storage subsystem, wherein the storage subsystem comprises a processing unit, a storage subsystem memory, and a plurality of storage tiers having differing performance characteristics, and an offload engine, wherein the offload engine comprises a processing unit and an offload memory, the method comprising:
   a. receiving a first metric associated with a desired percentage of data stored in a sorted array to be categorized as hot data;
   b. receiving a second metric associated with a desired percentage of data stored in the sorted array to be categorized as cold data;
   c. copying the sorted array from the storage subsystem to the offload engine;
   d. separating the sorted array using the offload engine, into first and second partitioned storage sectors, thereby creating a second sorted array, wherein the first partitioned storage sector in the second array contains hot data sorted in descending order, and the second partitioned storage sector in the second array contains cold data sorted in ascending order; and
   e. writing the second sorted array into the storage subsystem memory.

2. The method of claim 1 wherein the first metric and the second metric are received in the offload engine.

3. The method of claim 1 wherein the first metric and the second metric are received in the storage subsystem.

4. The method of claim 1 wherein the storage subsystem memory further comprises a database.

5. The method of claim 1 wherein the offload engine is external to data storage system.

6. A system comprising:
   a. a storage subsystem including a processing unit, a storage subsystem memory, and a plurality of storage tiers having different performance characteristics;
   b. an offload engine including a processing unit and an offload memory communicatively coupled to the storage subsystem;
   c. computer-executable logic, wherein the computer-executable logic is configured for the execution of:
      i. receiving a first metric associated with a desired percentage of data stored in the offload engine to be categorized as hot data;
      ii. receiving a second metric associated with a desired percentage of data stored in the offload engine to be categorized as cold data;
      iii. copying a sorted array from the storage subsystem to the offload engine;
      iv. separating the sorted array using the offload engine, into first and second partitioned storage sectors, thereby creating a second sorted array, wherein the first partitioned storage sector in the second array contains a plurality of hot data sorted in descending order, and the second partitioned storage sector in the second array contains a plurality of cold data sorted in ascending order; and v. writing the second sorted array into the storage subsystem memory.

7. The system of claim 6 wherein the first metric and the second metric are received in the offload engine.

8. The system of claim 6 wherein the first metric and the second metric are received in the storage subsystem.

9. The system of claim 6 wherein the storage subsystem memory further comprises a database.

10. The system of claim 6 wherein the offload engine is external to the data storage system.

11. The system of claim 6 wherein the computer executable logic is operating on the offload engine.

12. A computer program product for sorting data in a data storage system comprising a storage subsystem, wherein the storage subsystem comprises a processing unit, a storage subsystem memory, and a plurality of storage tiers having differing performance characteristics, and an offload engine, wherein the offload engine comprises a processing unit and an offload memory, the computer program product comprising a non-transitory computer readable medium encoded with computer-executable program code the code configured to enable the execution of:

a. receiving a first metric associated with a desired percentage of data stored in a sorted array to be categorized as hot data;

b. receiving a second metric associated with a desired percentage of data stored in the sorted array to be categorized as cold data;

c. copying the sorted array from the storage subsystem to the offload engine;

d. separating the sorted array using the offload engine, into first and second partitioned storage sectors, thereby creating a second sorted array, wherein the first partitioned storage sector in the second array contains hot data sorted in descending order, and the second partitioned storage sector contains in the second array cold data sorted in ascending order; and e. writing the second sorted array into the storage subsystem memory or a database located within the physical storage pool.

13. The computer program product of claim 12 wherein the first metric and the second metric are received in the offload engine.

14. The computer program product of claim 12 wherein the first metric and the second metric are received in the storage subsystem.

15. The computer program product of claim 12 wherein the storage subsystem memory further comprises a database.

16. The computer program product of claim 12 wherein the offload engine is external to the data storage system.

* * * * *